Dec. 29, 1942.    J. E. SMITH    2,306,913
ELECTRIC HEATING UNIT
Filed April 29, 1938
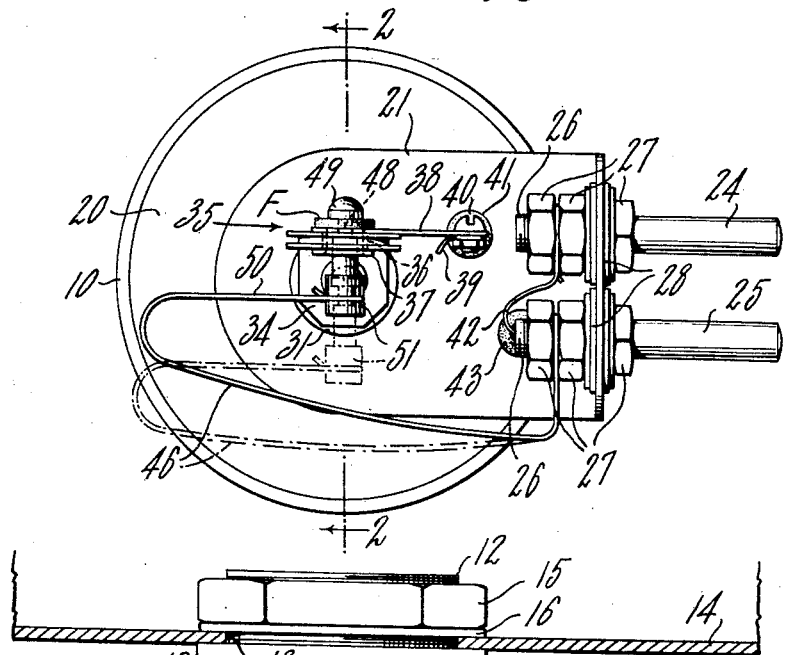
INVENTOR.
JOHN ERNEST SMITH
BY M. Theodore Simmons
ATTORNEY.

Patented Dec. 29, 1942

2,306,913

UNITED STATES PATENT OFFICE 2,306,913

ELECTRIC HEATING UNIT

John E. Smith, Plainfield, N. J.

Application April 29, 1938, Serial No. 205,049

6 Claims. (Cl. 219—44)

This invention relates to fuse protected electrical heating units, particularly of the type employed for heating the liquid contents of vessels such as coffee percolators, one of the principal features of improvement being in a fuse and switching mechanism whereby the heating element is more efficiently protected than heretofore.

Another feature of improvement resides in the provision of a heating well in direct communication with the liquid contents of the vessel, and a heating element or coil embedded in the well housing in close proximity to the well contributing to rapid transfer of heat enabling the resistance wire of the heating element to be operated at a relatively low temperature. For instance, in the present example to be described the heating unit operates at high efficiency while the resistance wire does not attain a temperature sufficient to cause it to reach red heat in service, the unit being so designed that it may be operated at considerably higher wattage per square inch of heating surface than prior types, while at the same time the heating wire itself operates at a comparatively low temperature.

A further feature of improvement concerns the construction and arrangement of the various parts of the unit whereby production and assembly is simplified and the manufacturing cost of the complete unit reduced to a minimum.

Various other features of improvement and advantage will appear as the description proceeds, reference being made to the accompanying drawing forming a part of this specification and in which:

Fig. 1 is a bottom plan view of an electrical heating unit embodying my invention.

Fig. 2 a side elevation thereof, and showing the unit installed in the bottom of a heating vessel, and Fig. 3 a cross-section on the line 2—2 of Fig. 1.

In the drawing the reference numeral 10 indicates a cast housing of metal having high thermal conductivity such as aluminum. The housing 10 is provided with a well 11 and a reduced and threaded extension 12 adapted to project through an opening 13 in the bottom 14 of a heating vessel such as a coffee percolator, a nut 15 and a suitable washer 16 being provided to insure a rigid, liquid tight joint between the housing 10 and the wall 14 of the vessel around the opening 13.

It will be seen that the well 11 is in direct communication with the interior of the heating vessel. In the case of percolators any well known type of pump will be fitted into the top of the well 11. For heating the contents of the well and consequently the entire body of liquid, the lower portion of the housing 10 is provided with a circumferential channel 17 adapted to contain a heating element comprising suitable resistance wire 18 embedded in heat resisting insulating material 19. A cover plate 20 bridges the channel 17 so as to entirely enclose the heating element 18 and its insulating material 19 in the channel. A bracket member 21 has a flat portion 22 faced against the cover plate 20, and a depending portion bent at a right-angle at 23 to provide a support for a pair of terminal pins 24 and 25 having threaded ends 26 for the nuts 27, the pins being insulated from the support by insulating pieces 28. Both the plate 20 and the portion 22 of the member 21 are provided with openings 29 adapted to receive a lug or extension 30 carried by the housing 10 beneath the bottom of the heating well 11, the lug being swaged over as indicated at 31 to provide a simple, inexpensive, and satisfactory way for rigidly securing the two plates to the housing 10. The lug 30 is provided with a small central extension constituting a secondary lug 32, adapted to project through an opening 33 in an angle piece 34, the end of the lug 32 being swaged over, providing a mounting for a fuse mechanism indicated generally at 35.

The outwardly projecting portion of the angle piece 34 has an opening 36 for the reception of an open rivet or member 37 having a link portion 38 of large heat-carrying capacity electrically connected to one end 39 of the wire heating element 18, a ceramic sleeve 40 being provided where the wire passes through registering openings 41 in the plate 20 and the bracket member 21. The other end 43 of the heating element 18 is passed through a ceramic sleeve 43 and connected to the terminal pin 24. The open rivet 37 is insulated from the angle piece 34 by suitably arranged insulating material such as washers 44.

A stud or member 45 is carried by one end of a spring 46, for instance of spring wire, which is rigidly mounted at its opposite end between the nuts 27 of the terminal pin 25, the arrangement being such that the stud is adapted to extend through the opening 47 in the rivet 37 as clearly shown in Fig. 3.

The stud is reduced at 48 to form a head 49 adapted to clamp a horse-shoe shaped element F of suitable fuse metal against the adjacent face of the open rivet 37 under the action of the spring wire 46 the tension of which tends to draw the stud outward from the opening in the rivet 37, which action results in firmly holding the fuse element in place straddling the stud and forming electrical connection between the end 39 of the heating element 18 and the terminal pin 25. The fuse element F may be plated with any suitable metal for better contact. Copper and nickel have been found satisfactory.

Current is supplied to the heating element 18 by the usual form of service plug which may be attached to and detached from the terminal pins 24 and 25 in the well known manner.

It is seen that the coils of the heating element 18 are relatively close to the well 11 and that the thickness of intervening metal is reduced to a minimum. This form of construction is advantageous in that it is conducive to rapid transfer of heat from the heating element to the liquid contents of the well, and, owing to this fact, the heating element may be operated at very high wattages as pointed out above.

If for any reason the temperature of the heating unit reaches the melting point of the fuse element F, the melting thereof will release the head 49 of the stud, and the wire spring 46 will then quickly pull the stud free and clear of the opening 47 of the rivet 37, thereby breaking the electrical connection between the end 39 of the heating element and the terminal pin 25, cutting off the current. This provides an efficient and reliable switching mechanism for protecting the entire unit, and in particular the heating element.

Referring to Fig. 1 it will be observed that the wire spring 46 extends for considerable length across the housing from its anchorage at the terminal pin 25, and is then returned bent at 50 for about one-half the distance and secured by its free end to the stud at the portion 51 thereof. By this arrangement of springing the stud is pulled free of the opening 47 in line with the axis thereof, which is substantially at a right-angle to the direction of flexure of the wire spring 46 from its anchorage point, whereby the stud is given a substantially straight line movement along said axis practically as shown in dot-and-dash lines in the drawing, during the short interval of time in which the stud is being cleared from the opening in the rivet 37. Such straight line pull of the stud by retractile action of the long spring results in quick disengagement of the stud from the associated parts of the bracket 34, insuring against catching or binding in the opening 47.

It is to be understood that the specific structure as described above may be modified without departing from the invention as set forth in this specification and the appended claims.

I claim:

1. In an electric heating unit having a housing provided with a well and an electric heating element associated with the well, a fuse controlled switching mechanism connected in circuit with the heating element and mounted on said unit, said mechanism including a member connected to one end of the heating element and also to said housing, an actuated member connected to the other end of the heating element, a spring connected to the actuated member and mounted to one side of said member, and a fuse element gripped between and forming electrical connection between the two members under tension of the spring, said first named member including a link having an opening therethrough, said spring actuated member comprising a stud having a head projecting through said opening, and said fuse being U-shaped and straddling said stud between said head and said first named member.

2. In an electrical heating unit having a casing, an electric heating element therefor comprising a resistance wire and insulating material in which the resistance wire is embedded with the ends of the resistance wire extending outside said casing, a pair of terminal pins, and a connection from the resistance wire to one of the terminal pins, a fuse comprising an apertured support mounted on said casing, a stud extending through said aperture, a spring mounting for said stud, the spring being connected to the other of said terminal pins, the electrical circuit to said heating element extending through the spring, a link from the resistance wire to the apertured member, and a fuse member engaging the stud to hold the same in place in the apertured member and against the tension of the spring.

3. In an electrical heating unit having a casing, an electric heating element therefor comprising a resistance wire and insulating material in which the resistance wire is embedded with the ends of the resistance wire extending outside said casing, a pair of terminal pins, and a connection from the resistance wire to one of the terminal pins, a fuse comprising an apertured support mounted on said casing, a stud extending through said aperture, a spring mounting for said stud, the spring being connected to the other of said terminal pins, the electrical circuit to said heating element extending through the spring, a link from the resistance wire to the apertured member, and a fuse element engaging the stud to normally hold the same in place in the apertured member and against the tension of the spring, said spring being constructed and mounted so as to withdraw the stud from the apertured member in a straight line upon the melting of the fuse member.

4. In an electrical heating unit having a shell consisting of an annular channel and a raised central portion extending above the channel, the channel being defined by thin walls, a well for receiving water to be heated and occupying substantially the whole of the central portion so that the walls thereof are thin, and a heating element comprising a resistance wire embedded in insulating material and located in the channel with a thin wall separating the well and heating element, a terminal mounting bracket secured to the central portion, a pair of terminal pins mounted in said bracket, one of the pins being connected directly to one end of said resistance wire, a fuse mounted upon the central portion near the heating element channel, a connection from the other terminal pin to the fuse, and a link from the fuse to the other end of the resistance wire.

5. In an electrical heating unit having a casing, a heating element therefor consisting of a resistance wire embedded in insulation materials with the ends of the resistance wire extending outside said casing and a pair of terminal pins to which the resistance wire is connected, a fuse switching mechanism interposed in the connection to one of the terminal pins and comprising a fuse mount secured to said casing, a movable member cooperating with the fuse mount and carried by a substantially U-shaped spring, the spring being secured to said casing, and a fuse element normally maintaining the movable member in place in the mount with the spring under tension.

6. In combination with an electric heating unit comprising a casing, a heating element therefor consisting of resistance wire embedded in insulation material, the ends of the resistance wire extending outside said casing, and a pair of terminal pins mounted to extend substantially perpendicularly of the axis of the heating unit, the ends of the resistance wire being connected to said terminal pins, of a fuse switching mechanism interposed in one of said connections, and comprising a fuse mount secured to said casing, a connection therefrom to one end of the resistance wire, a movable element cooperating with the mount, a substantially U-shaped spring to which the movable member is secured, said spring being mounted upon an end of one of the terminal pins, and a fuse element normally maintaining the movable member in position in the mount with the spring under tension.

JOHN E. SMITH.